(12) United States Patent
Valerio

(10) Patent No.: US 12,398,540 B2
(45) Date of Patent: Aug. 26, 2025

(54) MONITORING SYSTEM FOR WORK MACHINE

(71) Applicant: Caterpillar Inc., Peoria, IL (US)

(72) Inventor: Micheal David Valerio, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 17/819,478

(22) Filed: Aug. 12, 2022

(65) Prior Publication Data

US 2024/0052601 A1    Feb. 15, 2024

(51) Int. Cl.
*E02F 9/26* (2006.01)
*B60R 1/27* (2022.01)
*E02F 9/24* (2006.01)

(52) U.S. Cl.
CPC .............. *E02F 9/261* (2013.01); *B60R 1/27* (2022.01); *E02F 9/24* (2013.01); *B60R 2300/202* (2013.01)

(58) Field of Classification Search
CPC .... E02F 9/261; E02F 9/24; B60R 1/27; B60R 2300/202; B60R 1/00; B60R 1/20; B60R 1/22; B60R 1/24; B60R 1/25; B60R 1/26; B60R 1/28; B60R 11/04; B60R 2300/10; A61B 5/18; B60K 2370/21; B60L 53/37; B60Q 9/005
USPC ........................................................ 348/148
See application file for complete search history.

(56) References Cited

U.S. PATENT DOCUMENTS

| 8,137,008 | B1 | 3/2012 | Mallano |
| 11,029,583 | B2 | 6/2021 | Stein |
| 2015/0288857 | A1* | 10/2015 | Fay .................. F16M 11/10 |
| | | | 348/36 |
| 2017/0291546 | A1* | 10/2017 | Lai .................... B60Q 9/008 |
| 2021/0071394 | A1* | 3/2021 | Kean ..................... E02F 9/261 |
| 2022/0058826 | A1 | 2/2022 | Hasegawa et al. |
| 2022/0154425 | A1* | 5/2022 | Yamamoto ........... E02F 9/2203 |

FOREIGN PATENT DOCUMENTS

| CN | 100364334 | 1/2008 |
| GB | 2547785 | 8/2017 |

\* cited by examiner

*Primary Examiner* — Thai Q Tran
*Assistant Examiner* — Nienru Yang

(57) ABSTRACT

A monitoring system for a work machine includes at least one imaging device disposed on the work machine and at least one mounting device that support the at least one imaging device. The at least one mounting device includes at least one sensor that generates an input signal indicative of a current orientation of the mounting device. The monitoring system further includes a controller including one or more memories and one or more processors. The one or more processors are configured to receive the input signal from the sensor, determine a location of the imaging device on the work machine and a field of view of the imaging device, determine a presence of blind spots around the work machine, and generate a pictorial view depicting the blind spots around the work machine. The monitoring system further includes a user interface that displays the pictorial view thereon.

20 Claims, 4 Drawing Sheets

MONITORING SYSTEM FOR WORK MACHINE

TECHNICAL FIELD

The present disclosure relates to a monitoring system for a work machine and a method of generating awareness of a surrounding area of the work machine.

BACKGROUND

A work machine, such as, a loader, a dozer, and the like may be used to perform various work operations at a worksite. While the work machine is operating at the worksite or travelling from one place to another, it may be desirable to monitor a surrounding area of the work machine to detect a presence of objects or people. For this purpose, one or more imaging devices may be mounted on the work machine. The imaging devices may generate images or videos of the surrounding area of the work machine.

The imaging devices are typically mounted on the work machine in a fixed orientation, and a field of view of the imaging devices may not cover each area surrounding the work machine, thereby creating blind spots for machine operators. In some cases, a mounting device may be used to mount a corresponding imaging device on the work machine. The mounting devices may be used to adjust an orientation of the corresponding imaging device. However, such mounting devices offer limited adjustment capability and may not cover each area surrounding the work machine. Further, as the presence of the blind spots may be dynamic in nature, new blind spots may be created each time the imaging devices are adjusted. Thus, in order to efficiently operate the work machine and to create awareness of the surrounding area of the work machine, it may be imperative that the machine operator is aware of the blind spots around the work machine.

CN100364334C describes a monitoring system and its method using mobile communication terminal dead angle area. A camera is mounted at a rotatable driving part set at the dead angle area of a transport means. One communicating manner is selected from the close range wire/wireless communicating manners set at the mobile communicating terminal and is connected with a camera driving controller which is used for controlling the driving part and is switched-in camera images. The filmed images mentioned above are displayed at a mobile communicating terminal display screen. Once obstacles appear, the camera driving part mentioned above is started-up to change the pointing angle of the camera, and the distance from the obstacle is displayed at the mobile communicating terminal display screen according to the pointing angle to ensure that users can make sure the dead angle area through visions and can grasp the distance to the obstacle. Hence, on the basis of the more specific distance data, the effects of transport means driving safely are obtained.

SUMMARY OF THE DISCLOSURE

In an aspect of the present disclosure, a monitoring system for a work machine is provided. The monitoring system includes at least one imaging device disposed on the work machine. The at least one imaging device has a field of view. The monitoring system also includes at least one mounting device adapted to support the at least one imaging device. The at least one mounting device is adjustable to a plurality of orientations. The at least one mounting device includes at least one sensor configured to generate an input signal indicative of a current orientation of the at least one mounting device. The monitoring system further includes a controller communicably coupled to the at least one imaging device and the at least one mounting device. The controller includes one or more memories and one or more processors communicably coupled with the one or more memories. The one or more processors are configured to receive the input signal from the at least one sensor. The one or more processors are also configured to determine a location of the at least one imaging device on the work machine and the field of view of the at least one imaging device. The one or more processors are further configured to determine a presence of one or more blind spots around the work machine based on the current orientation of the at least one mounting device, the location of the at least one imaging device on the work machine, and the field of view of the at least one imaging device. The one or more processors are configured to generate a pictorial view depicting the one or more blind spots around the work machine. The monitoring system includes a user interface configured to receive the pictorial view from the one or more processors. The user interface is further configured to display the pictorial view thereon.

In another aspect of the present disclosure, a monitoring system for a work machine is provided. The monitoring system includes a controller communicably coupled to at least one imaging device associated with the work machine and at least one mounting device adapted to support the at least one imaging device. The controller includes one or more memories and one or more processors communicably coupled with the one or more memories. The one or more processors are configured to receive an input signal indicative of a current orientation of the at least one mounting device. The one or more processors are also configured to determine a location of the at least one imaging device on the work machine and a field of view of the at least one imaging device. The one or more processors are further configured to determine a presence of one or more blind spots around the work machine based on the current orientation of the at least one mounting device, the location of the at least one imaging device on the work machine, and the field of view of the at least one imaging device. The one or more processors are configured to generate a pictorial view depicting the one or more blind spots around the work machine.

In another aspect of the present disclosure, a method of generating awareness of a surrounding area of a work machine is provided. The method includes receiving, by a controller, an input signal indicative of a current orientation of at least one mounting device adapted to support at least one imaging device on the work machine. The method also includes determining, by the controller, a location of the at least one imaging device on the work machine and a field of view of the at least one imaging device. The method further includes determining, by the controller, a presence of one or more blind spots around the work machine based on the current orientation of the at least one mounting device, the location of the at least one imaging device on the work machine, and the field of view of the at least one imaging device. The method includes generating, by the controller, a pictorial view depicting the one or more blind spots around the work machine. The method also includes displaying, on a user interface, the pictorial view depicting the one or more blind spots.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
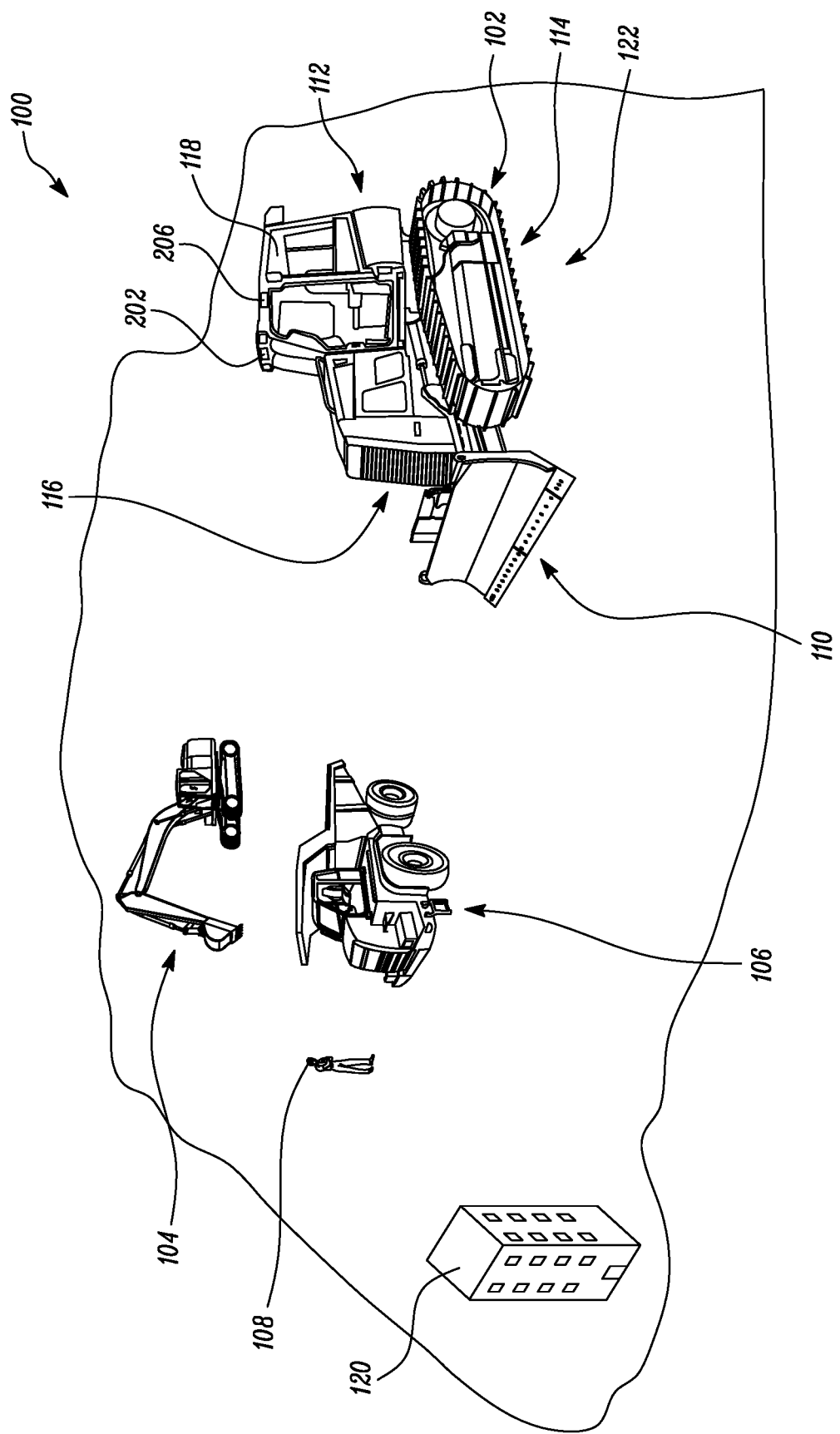
FIG. 1 illustrates a worksite and a number of machines operating at the worksite, according to an example of the present disclosure.

Referring to FIG. 1, an exemplary worksite 100 is illustrated. The worksite 100 may be a construction site, a mining site, and the like. The worksite 100 includes a number of work machines 102, 104, 106 and one or more personnel 108. Although three work machines 102, 104, 106 are illustrated in FIG. 1, a number of work machines may operate at the worksite 100. In the illustrated example of FIG. 1, the work machine 102 includes a track type tractor, the work machine 104 includes an excavator, and the work machine 106 includes an off-highway truck. It should be noted that the work machines 102, 104, 106 may include any other type of machine used for performing work operations, such as, loading, hauling, dumping, filling, cutting, excavating, spreading, compacting, grading, dozing, etc.

As shown in FIG. 1, the work machine 102 includes a front end 110, a rear end 112, a first side 114, and a second side 116. The work machine 102 also includes an operator cabin 118. An operator may be seated within the operator cabin 118 of the work machine 102 for controlling the work machine 102. The operator cabin 118 may include one or more controls (not shown), such as, joysticks, pedals, levers, buttons, switches, knobs, audio visual devices, operator consoles, a steering wheel, and the like. The controls may enable the operator to control the work machine 102. Alternatively, the operator may be seated at a remote operator station 120 that is externally located relative to the work machine 102. The remote operator station 120 may include one or more controls that may enable the operator to control the work machines 102, 104, 106. In some examples, a single operator may control each work machine 102, 104, 106 while being seated at the remote operator station 120. Alternatively, the work machines 102, 104, 106 may be controlled by different operators seated at the remote operator station 120.

Figure 2:
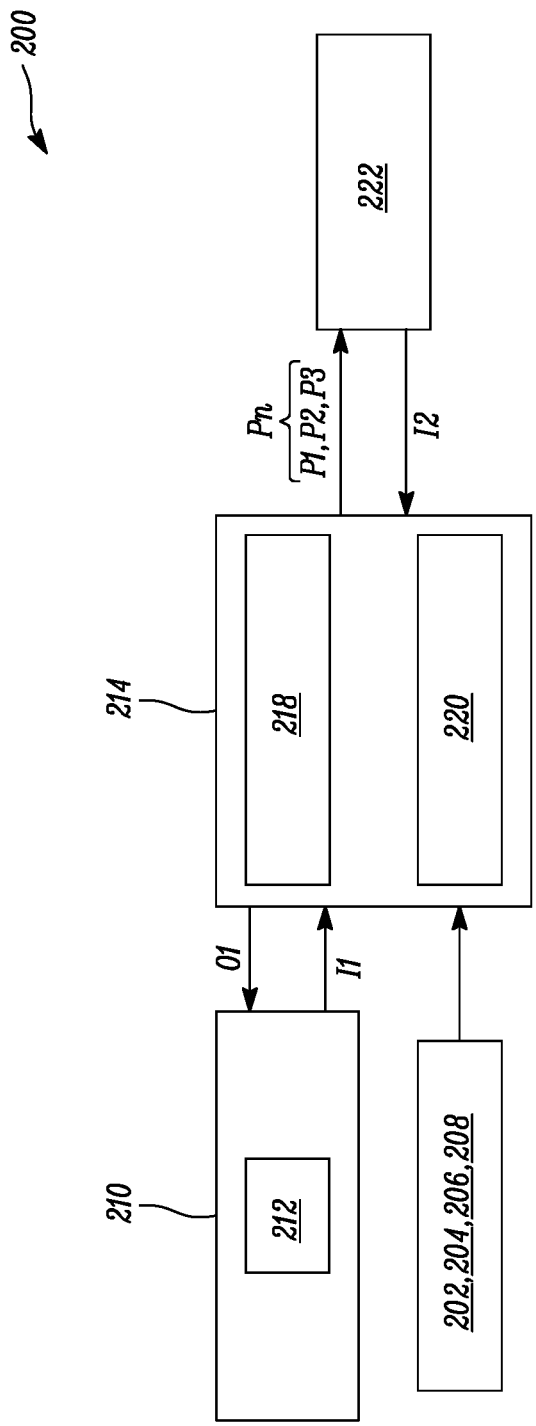
FIG. 2 is a block diagram of a monitoring system for the work machine shown in FIG. 1, according to an example of the present disclosure.

Referring to FIG. 2, a block diagram of a monitoring system 200 for the work machine 102 (see FIG. 1) is illustrated. The monitoring system 200 may be used to monitor and generate awareness of a surrounding area 122 (see FIG. 1) of the work machine 102. Although the monitoring system 200 is being explained in relation to the monitoring of the surrounding area 122 of the work machine 102. The monitoring system 200 may also be used to monitor a surrounding area of the work machines 104, 106 (see FIG. 1), without any limitations.

The monitoring system 200 includes one or more imaging devices 202, 204, 206, 208 disposed on the work machine 102. In the illustrated example of FIG. 2, the monitoring system 200 includes four imaging devices 202, 204, 206, 208. However, the monitoring system 200 may include any number of the imaging devices 202, 204, 206, 208, without any limitations. The one or more imaging devices 202, 204, 206, 208 have a field of view "F1", "F2", "F3", "F4" (shown in FIG. 3). Specifically, the imaging device 202 having the field of view "F1" is disposed proximate to the front end 110 (see FIG. 1) of the work machine 102. Further, the imaging device 204 having the field of view "F2" is disposed proximate to the rear end 112 (see FIG. 1) of the work machine 102. Furthermore, the imaging device 206 having the field of view "F3" is disposed at the first side 114 (see FIG. 1) of the work machine 102. Moreover, the imaging device 208 having the field of view "F4" is disposed at the second side 116 (see FIG. 1) of the work machine 102.

In an example, the imaging devices 202, 204, 206, 208 may include a camera. In another example, the imaging devices 202, 204, 206, 208 may include a digital video camera, such as, an ethernet camera to provide an electronic motion picture acquisition. It should be noted that the imaging devices 202, 204, 206, 208 may include any other type of conventional imaging device that captures still images or videos.

The monitoring system 200 also includes one or more mounting devices 210 that supports the one or more imaging devices 202, 204, 206, 208. It should be noted that each imaging device 202, 204, 206, 208 is mounted on the work machine 102 by a corresponding mounting device 210. Thus, the monitoring system 200 may include four mounting devices 210 to support the four imaging devices 202, 204, 206, 208. The one or more mounting devices 210 are adjustable to a number of orientations. Based on the adjustment of the one or more mounting devices 210 to different orientations, the field of view "F1", "F2", "F3", "F4" of the imaging devices 202, 204, 206, 208, respectively, may vary so as to capture images or videos of different portions of the surrounding area 122. The one or more mounting devices 210 includes one or more sensors 212 that generate an input signal "I1" indicative of a current orientation of the one or more mounting devices 210. It should be noted that the mounting devices 210 may include any number of the sensors 212, without any limitations. In some examples, the one or more sensors 212 may include, but is not limited to, a position sensor.

The mounting devices 210 may include brackets, coupling elements, and the like for movably coupling the mounting devices 210 with a stationary element, such as, a frame of the work machine 102. Further, each mounting device 210 may include an adjustment assembly (not shown). The adjustment assembly may receive signals for adjusting the mounting device 210 to different orientations relative to the stationary element of the work machine 102, as per application requirements. In an example, the adjustment assembly may include one or more actuators. It should be noted that each mounting device 210 may include any combination of elements that may allow adjustment of the mounting device 210 to different orientations.

The monitoring system 200 further includes a controller 214 communicably coupled to the one or more imaging devices 202, 204, 206, 208 associated with the work machine 102 and the one or more mounting devices 210 that supports the one or more imaging devices 202, 204, 206, 208. In some examples, the imaging devices 202, 204, 206, 208 and the mounting devices 210 may be communicably coupled to the controller 214, via a communication medium (not shown). Examples of the communication medium may include, but are not limited to, a Wide Area Network (WAN), a Local Area Network (LAN), an internet, an intranet, a cellular network, a satellite network, or any other known network for transmitting and receiving data. In various examples, the communication medium may include a combination of two or more of the aforementioned networks and/or other types of networks known in the art. Further, the communication medium may be implemented as a wired network, a wireless network, or a combination thereof. In an example, the controller 214 may be present onboard the work machine 102. In another example, the controller 214 may be present at the remote operator station 120 (see FIG. 1).

The controller 214 includes one or more memories 218 and one or more processors 220 communicably coupled with the one or more memories 218. Further, the one or more processors 220 may be communicably coupled to the one or more sensors 212. The one or more processors 220 may be any device that performs logic operations. It should be noted that the one or more processors 220 may embody a single microprocessor or multiple microprocessors for receiving various input signals. Numerous commercially available microprocessors may be configured to perform the functions of the one or more processors 220. The one or more processors 220 may further include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The one or more processors 220 may include one or more components that may be operable to execute computer executable instructions or computer code that may be stored and retrieved from the one or more memories 218.

In some examples, the mounting devices 210 are adjustable based on an input received from the operator. More particularly, the processors 220 may receive the input from the operator to adjust the mounting devices 210 to a desired orientation based on a preference of the operator. Accordingly, the processors 220 may control the adjustment assembly associated with the corresponding mounting device 210 for adjusting the mounting devices 210 to the desired orientation.

In another example, the mounting devices 210 may be automatically adjustable based on the preference of the operator. For example, the mounting devices 210 may be automatically adjusted based on a change in a state of the work machine 102. More particularly, if the work machine 102 switches to a parked state, the mounting devices 210 may be automatically adjusted so that the imaging devices 202, 204, 206, 208 can provides improved ground coverage. Further, when the work machine 102 is not in the parked state, the mounting devices 210 may be automatically adjusted so that the imaging devices 202, 204, 206, 208 may provide optimum views of the surrounding area 122 of the work machine 102. In such examples, the memories 218 may contain prestored information related to preferences of multiple operators. Further, the processors 220 may identify the operator who is currently in charge of the work machine 102. Based on the identification, the processors 220 may automatically adjust the mounting devices 210 to a desired orientation, as per the preference of the identified operator.

The monitoring system 200 further includes a user interface 222 communicably coupled to the controller 214. In an example, the user interface 222 is present within the operator cabin 118 of the work machine 102. In another example, the user interface 222 is present at the remote operator station 120 that is externally located relative to the work machine 102. In yet another example, the user interface 222 may be present with the personnel 108 (see FIG. 1). Further, the controller 214 may be an integral component of the user interface 222. Alternatively, the controller 214 and the user interface 222 may be embodied as separate components.

Figure 3:
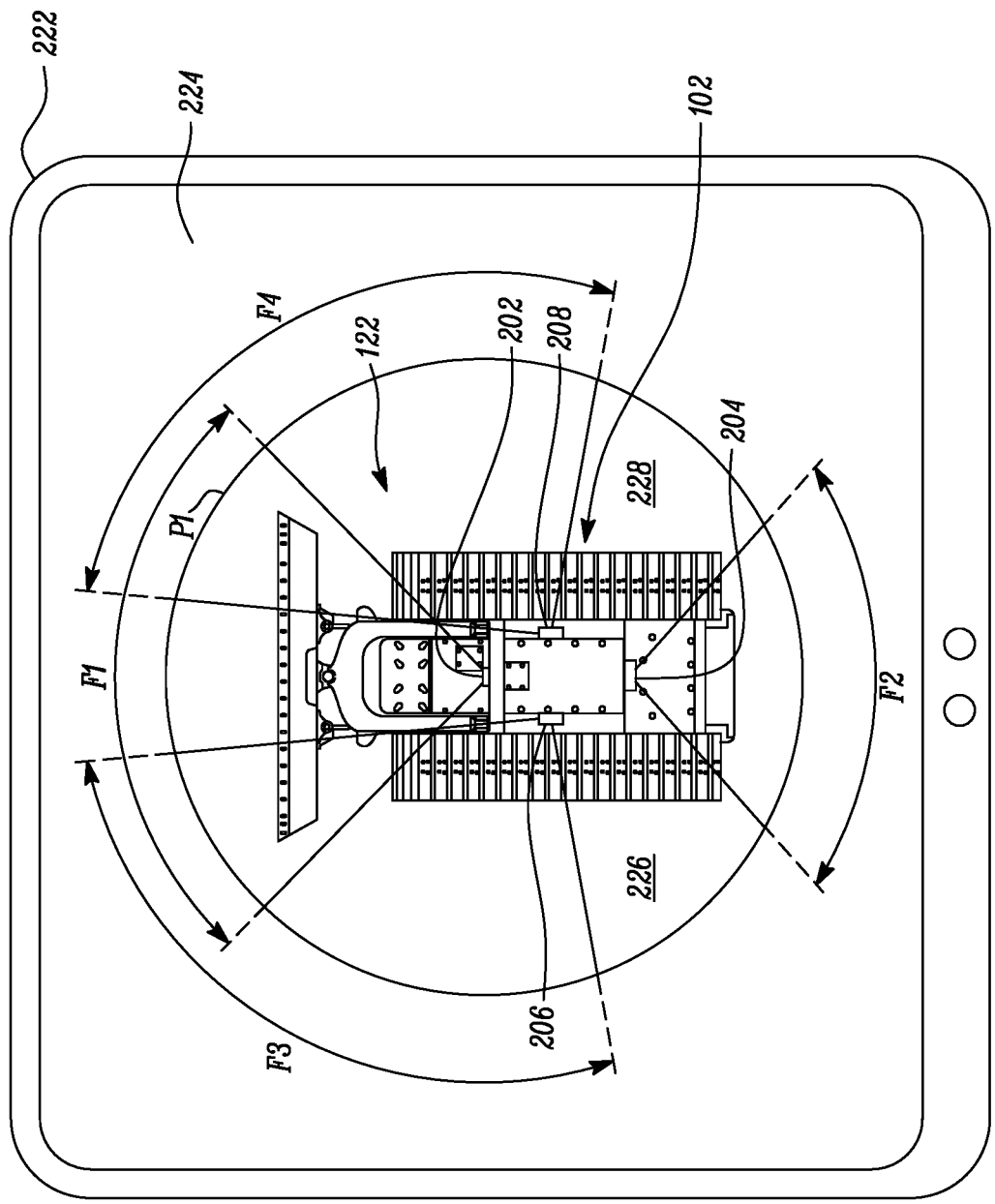
FIG. 3 illustrates a pictorial view displayed on a user interface, according to an example of the present disclosure.

The user interface 222 includes a display screen 224 (shown in FIG. 3). The user interface 222 may include an electroluminescent display, liquid crystal display (LCD), light-emitting diode (LED) display, a thin-film transistor (TFT), and the like. Further, the user interface 222 may include a portable handheld device, such as, a mobile phone, a tablet, and the like. The user interface 222 embody a laptop, a desktop, and the like. The user interface 222 may embody a touch screen. In such an example, the user interface 222 may present various control icons on the touch screen. Alternatively, the user interface 222 may include one or more physical input devices, such as, a switch, a button, a lever, a knob, and the like, without any limitations, as well as their image representations on the touch screen. It may also be contemplated that the user interface 222 may embody a heads-up display unit, without any limitations. Further, the user interface 222 may generate visual notifications as well as audible notifications.

Further, the one or more processors 220 receive the input signal "I1" indicative of the current orientation of the one or more mounting devices 210. Specifically, the one or more processors 220 receive the input signal "I1" from the one or more sensors 212. It should be noted that the input signal "I1" may be generated each time the one or more mounting devices 210 are adjusted, so that the processors 220 have a real-time data of the current orientation of the mounting devices 210.

Further, the one or more processors 220 determine a location of the one or more imaging devices 202, 204, 206, 208 on the work machine 102 and the field of view "F1", "F2", "F3", "F4" of the one or more imaging devices 202, 204, 206, 208. The location of the imaging devices 202, 204, 206, 208 may be prestored within the memories 218 of the controller 214. Further, the processors 220 may retrieve information pertaining to the location of the imaging devices 202, 204, 206, 208 from the memories 218. In some examples, the memories 218 may also store information related to dimensions of the work machine 102. The dimensions of the work machine 102 may be used to determine the location of the imaging devices 202, 204, 206, 208 with respect to one or more portions of the work machine 102, such as the operator cabin 118 or one or more work implements of the work machine 102. In an example, the field of view "F1", "F2", "F3", "F4" of the imaging devices 202, 204, 206, 208, respectively, may be prestored within the memories 218 of the controller 214 and may be retrieved from the processors 220 as and when required. In another example, the field of view "F1", "F2", "F3", "F4" may be a dynamic parameter that may be updated in real-time each time the mounting devices 210 are adjusted.

Further, the one or more processors 220 determine the presence of one or more blind spots 226, 228 (shown in FIG. 3) around the work machine 102 based on the current orientation of the one or more mounting devices 210, the location of the one or more imaging devices 202, 204, 206, 208 on the work machine 102, and the field of view "F1", "F2", "F3", "F4" of the one or more imaging devices 202, 204, 206, 208. The term "blind spots" as used herein may refer to an area around the work machine 102 that does not lie in the field of view "F1", "F2", "F3", "F4" of the imaging devices 202, 204, 206, 208.

Further, the one or more processors 220 generate a pictorial view "P1" depicting the one or more blind spots 226, 228 around the work machine 102. Specifically, the one or more processors 220 generate the pictorial view "P1" depicting the one or more blind spots 226, 228 each time the one or more mounting devices 210 are adjusted. More particularly, when the mounting devices 210 are adjusted, the field of view "F1", "F2", "F3", "F4" of the imaging devices 202, 204, 206, 208, respectively, may change due to which a location of the blind spots 226, 228 may vary. Thus, the processors 220 may generate an updated pictorial view depicting the blind spots 226, 228 each time the mounting devices 210 are adjusted.

Furthermore, the user interface 222 receives the pictorial view "P1" from the one or more processors 220. Moreover, the user interface 222 displays the pictorial view "P1" thereon. It should be noted that the pictorial view "P1" may include a still image or a video that is displayed on the display screen 224 of the user interface 222. In addition to the pictorial view "P1", the user interface 222 may also provide audible alerts (such as, voice messages) to the operator regarding the presence of the blind spots 226, 228. In some examples, the user interface 222 may flash warning lights to alert the operator regarding the presence of the one or more blind spots 226, 228. It may be noted that the user interface 222 may use a single technique or a combination of techniques to alert the operator regarding the presence of the blind spots 226, 228, and the present disclosure is not limited by a technique of alerting the operator regarding the presence of the blind spots 226, 228.

FIG. 3 illustrates the exemplary pictorial view "P1" displayed on the user interface 222. The pictorial view "P1" is displayed on the display screen 224 of the user interface 222. It should be noted that, for illustrative purposes, only the pictorial view "P1" is shown on the display screen 224. However, the display screen 224 may also display other notifications, such as, available fuel capacity, speed of the work machine 102, and the like, without any limitations.

As shown in FIG. 3, the pictorial view "P1" includes the one or more blind spots 226, 228 around the work machine 102. In the illustrated example of FIG. 3, the blind spot 226 is present between the field of views "F2", "F3", and the blind spot 228 is present between the field of views "F2", "F4". In other examples, the pictorial view "P1" may include a single blind spot or any number of blind spots, without any limitations.

The pictorial view "P1" further depicts the field of view "F1", "F2", "F3", "F4" of the one or more imaging devices 202, 204, 206, 208. As illustrated herein, the field of views "F1", "F3" of the imaging devices 202, 206 overlap with each other, and the field of views "F1", "F4" of the imaging devices 202, 208 overlap with each other. In some examples, each field of view "F1", "F2", "F3", "F4" may be depicted by a unique indicating feature. For example, the field of views "F1", "F2", "F3", "F4" may be depicted by different colors, different hatchings, or any other indication features, without any limitations.

Referring again to FIG. 2, in some examples, based on the determination of the one or more blind spots 226, 228 (see FIG. 3) around the work machine 102, the one or more processors 220 further generate an output signal "O1" for adjusting the one or more mounting devices 210 in order to minimize an area of the one or more blind spots 226, 228. More particularly, the processors 220 may analyze a location of the blind spots 226, 228 around the work machine 102. Based on the analysis, the processors 220 may determine an orientation of the mounting devices 210 that may minimize the blind spots 226, 228, and more particularly, the area of the blind spots 226, 228. In some examples, the processors 220 may analyze if the field of views "F1", "F2", "F3", "F4" of two or more imaging devices 202, 204, 206, 208 overlap with each other. In such examples, the processors 220 may adjust the mounting devices 210 of the one or more of the imaging devices 202, 204, 206, 208 in a manner that may minimize the overlapping field of views while also minimizing the area of the blind spots 226, 228.

Further, in some examples, the operator seated at the remote operator station 120 (see FIG. 1) may be in charge of operating each work machine 102, 104, 106 (see FIG. 1) at the worksite 100 (see FIG. 1). Thus, the operator may desire to view blind spots around each work machine 102, 104, 106 at the worksite 100. In such examples, the one or more processors 220 generate a number of pictorial views "Pn" corresponding to the number of work machines 102, 104, 106. The pictorial views "P1", "P2", "P3" from the number of pictorial views "Pn" may depict one or more blind spots present around the corresponding work machine 102, 104, 106.

Further, the one or more processors 220 transmit the one or more pictorial views "P1", "P2", "P3" from the number of pictorial views "Pn" based on an operator input "I2". More particularly, the processors 220 may receive the operator input "I2" via the user interface 222. Accordingly, one or more of the pictorial views "P1", "P2", "P3" may be displayed on the user interface 222. Thus, when the operator is in charge of operating the work machines 102, 104, 106, it may be possible to switch between the pictorial views "P1", "P2", "P3" of the work machines 102, 104, 106, based on the operator input "I2". In some examples, the user interface 222 may display two or more of the pictorial views "P1", "P2", "P3" adjacent to each other, based on an input received from the operator so that the operator is aware of the blind spots around each work machine 102, 104, 106.

INDUSTRIAL APPLICABILITY

The present disclosure relates to the monitoring system 200 associated with the work machine 102. The monitoring system 200 includes the imaging devices 202, 204, 206, 208, the mounting devices 210 for supporting the corresponding imaging device 202, 204, 206, 208, and the controller 214 communicably coupled to the imaging devices 202, 204, 206, 208 and the mounting devices 210. The monitoring system 200 may generate awareness of the surrounding area 122 of the work machine 102. More particularly, based on the current orientation of the mounting devices 210, the location of the imaging devices 202, 204, 206, 208, and the field of view "F1", "F2", "F3", "F4" of the imaging devices 202, 204, 206, 208, the monitoring system 200 may be used to determine the presence of the one or more blind spots 226, 228 around the work machine 102.

The monitoring system 200 described herein may provide a real time update of the blind spots 226, 228 present around the work machine 102. The monitoring system 200 may improve an accuracy with which the work machine 102 may be monitored. The monitoring system 200 may further allow adjustment of the mounting devices 210 to a desired orientation so that the area of the one or more blind spots 226, 228 is minimal. Thus, the monitoring system 200 may ensure that a maximum region of the surrounding area 122 of the work machine 102 lies in the field of view "F1", "F2", "F3", "F4" of the imaging devices 202, 204, 206, 208, thereby improving monitoring of the work machine 102. Furthermore, the monitoring system 200 may also generate the pictorial view "P1" depicting the one or more blind spots 226, 228 that can be displayed on the user interface 222 present in the operator cabin 118 or the remote operator station 120. The monitoring system 200 may improve a confidence of the operator, improve operator awareness, and may reduce a scope of errors while operating the work machine 102.

Further, the monitoring system 200 may be embodied as a modular monitoring system that may be used with different types of work machines. The monitoring system 200 may be embodied as an aftermarket kit that may be used to monitor blind spots around various work machines. Further, the monitoring system 200 includes usage of conventional imaging devices that may be already present on existing work machines or can be easily mounted on existing work machines with minimum modifications. Moreover, the mounting devices 210 may include low-cost elements that may be easily retrofitted on existing work machines. Thus, the monitoring system 200 may be cost-effective to incorporate on various work machines.

Figure 4:
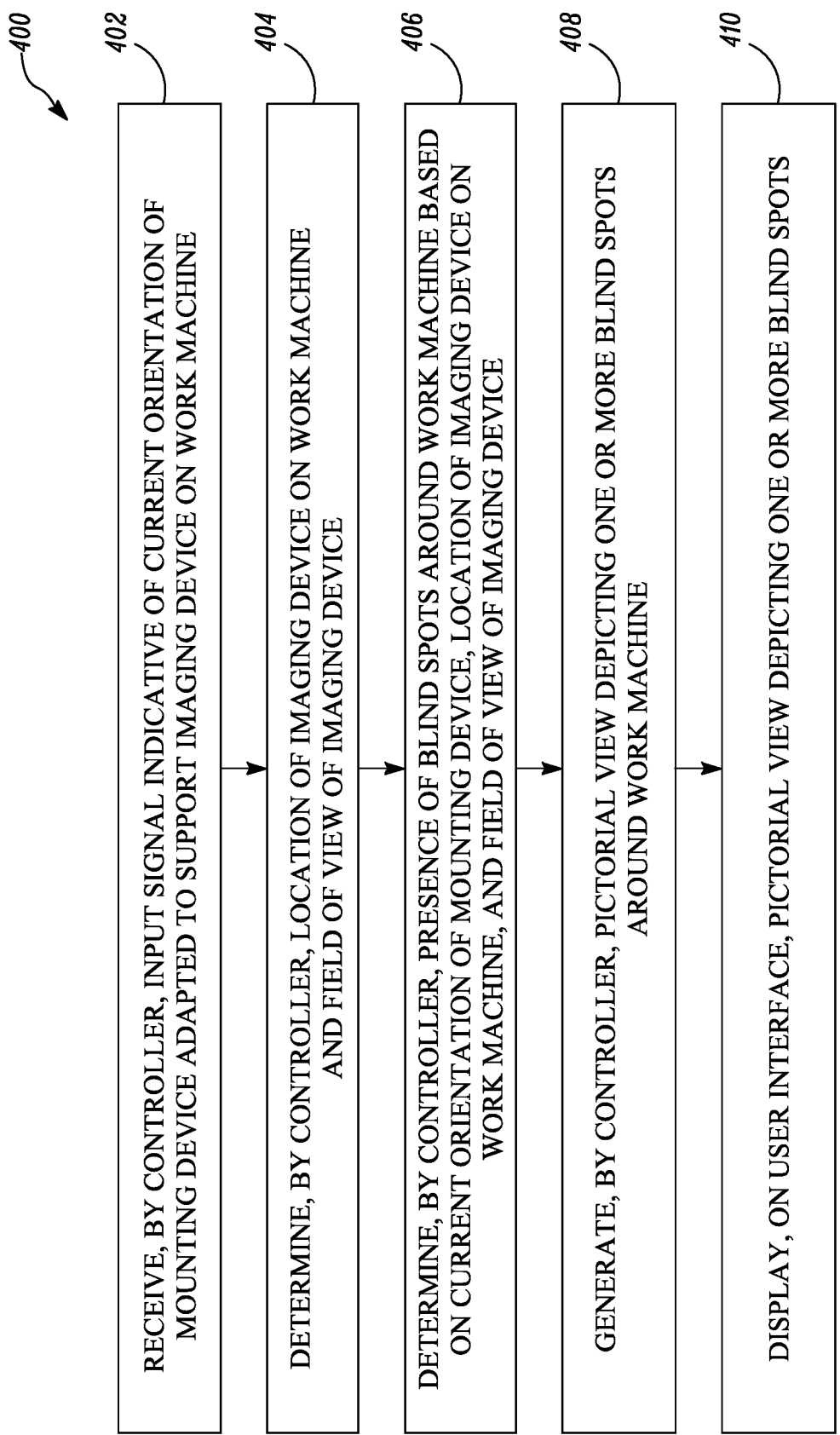
FIG. 4 is a flowchart for a method of generating awareness of a surrounding area of the work machine, according to an example of the present disclosure.

Referring to FIG. 4, a flowchart for a method 400 of generating awareness of the surrounding area 122 of the work machine 102 is illustrated, in accordance with an example of the present disclosure. At step 402, the controller 214 receives the input signal "I1" indicative of the current orientation of the one or more mounting devices 210 that support the one or more imaging devices 202, 204, 206, 208 on the work machine 102.

At step 404, the controller 214 determines the location of the one or more imaging devices 202, 204, 206, 208 on the work machine 102 and the field of view "F1", "F2", "F3", "F4" of the one or more imaging devices 202, 204, 206, 208.

At step 406, the controller 214 determines the presence of the one or more blind spots 226, 228 around the work machine 102 based on the current orientation of the one or more mounting devices 210, the location of the one or more imaging devices 202, 204, 206, 208 on the work machine 102, and the field of view "F1", "F2", "F3", "F4" of the one or more imaging devices 202, 204, 206, 208.

At step 408, the controller 214 generates the pictorial view "P1" depicting the one or more blind spots 226, 228 around the work machine 102. In some examples, the controller 214 generates the pictorial view "P1" depicting the one or more blind spots 226, 228 each time the one or more mounting devices 210 are adjusted. At step 410, the user interface 222 displays the pictorial view "P1" depicting the one or more blind spots 226, 228.

In some examples, the controller 214 generates the number of pictorial views "Pn" corresponding to the number of work machines 102, 104, 106. The controller 214 further transmits the one or more pictorial views "P1", "P2", "P3" from the number of pictorial views "Pn" based on the operator input "I2".

In some examples, the controller 214 further generates the output signal "O1" for adjusting the one or more mounting devices 210 in order to minimize the area of the one or more blind spots 226, 228 based on the determination of the one or more blind spots 226, 228 around the work machine 102.

While aspects of the present disclosure have been particularly shown and described with reference to the embodiments above, it will be understood by those skilled in the art that various additional embodiments may be contemplated by the modification of the disclosed work machines, systems and methods without departing from the spirit and scope of the disclosure. Such embodiments should be understood to fall within the scope of the present disclosure as determined based upon the claims and any equivalents thereof.

What is claimed is:

1. A monitoring system for a work machine, the monitoring system comprising:
at least one imaging device having a field of view;
at least one mounting device disposed at a mounting location on the work machine, wherein the at least one mounting device:
is adapted to support the at least one imaging device,
comprises components that movably couple the at least one mounting device to a frame of the work machine and cause the at least one mounting device to be adjustable to a plurality of orientations relative to the frame of the work machine, and
comprises at least one position sensor configured to generate a positional signal indicative of a current orientation of the at least one mounting device relative to the frame of the work machine;
a controller communicably coupled to the at least one imaging device and the at least one mounting device, wherein the controller includes one or more memories and one or more processors communicably coupled with the one or more memories, and wherein the controller is configured to:
receive the positional signal, indicating the current orientation of the at least one mounting device relative to the frame of the work machine, from the at least one position sensor of the at least one mounting device;
determine the mounting location of the at least one mounting device and the at least one imaging device on the work machine;
determine the field of view of the at least one imaging device;
determine areas of one or more blind spots, around the work machine and outside the field of view of the at least one imaging device, based on:
the current orientation of the at least one mounting device relative to the frame of the work machine,
the mounting location of the at least one mounting device and the at least one imaging device on the work machine, and
the field of view of the at least one imaging device; and
generate a pictorial view depicting the areas of the one or more blind spots around the work machine and outside the field of view of the at least one imaging device; and
a user interface configured to:
receive the pictorial view from the controller; and
display the pictorial view depicting the areas of the one or more blind spots around the work machine and outside the field of view of the at least one imaging device.

2. The monitoring system of claim 1, wherein the controller is configured to generate the pictorial view, depicting the areas of the one or more blind spots, at times at which the positional signal indicates that the current orientation of the at least one mounting device, relative to the frame, has been adjusted.

3. The monitoring system of claim 1, wherein the pictorial view further depicts second areas within the field of view of the at least one imaging device.

4. The monitoring system of claim 1, wherein the user interface is present within an operator cabin of the work machine.

5. The monitoring system of claim 1, wherein the user interface is present at a remote operator station that is externally located relative to the work machine.

6. The monitoring system of claim 1, wherein the controller is further configured to:
generate a plurality of pictorial views; and
transmit at least one pictorial view from the plurality of pictorial views based on an operator input.

7. The monitoring system of claim 1, wherein, based on determining the areas of the one or more blind spots, around the work machine and outside the field of view of the at least one imaging device, the controller is further configured to generate an output signal for adjusting the current orientation of the at least one mounting device in order to minimize the areas of the one or more blind spots.

8. The monitoring system of claim 1, wherein:
the at least one imaging device comprises a plurality of imaging devices,
the at least one mounting device comprises a plurality of mounting devices, different mounting devices of the plurality of mounting devices being disposed at different mounting locations on the work machine and being adapted to support different imaging devices of the plurality of imaging devices,
the controller is configured to receive positional signals, from position sensors associated with the different mounting devices, indicating respective current orientations of the different mounting devices relative to the frame of the work machine,
the areas of the one or more blind spots, depicted in the pictorial view, are around the work machine and outside a collective field of view of the plurality of imaging devices, and
the controller is configured to determine the areas of the one or more blind spots based on:
the respective current orientations of the different mounting devices,
respective mounting locations of the different mounting devices and the different imaging devices on the work machine, and
respective fields of view of the different imaging devices.

9. A monitoring system for a work machine, the monitoring system comprising:
a controller communicably coupled to at least one imaging device associated with the work machine and at least one mounting device,
wherein the at least one mounting device:
is adapted to support the at least one imaging device, and
comprises components that movably couple the at least one mounting device to a frame of the work machine and cause the at least one mounting device to be adjustable to a plurality of orientations relative to the frame of the work machine,
wherein the controller includes one or more memories and one or more processors communicably coupled with the one or more memories, and
wherein the controller is configured to:
receive a positional signal indicative of a current orientation, of the plurality of orientations, of the at least one mounting device relative to the frame of the work machine;
determine a mounting location of the at least one mounting device and the at least one imaging device on the work machine;
determine a field of view of the at least one imaging device;
determine areas of one or more blind spots, around the work machine and outside the field of view of the at least one imaging device, based on:
the current orientation of the at least one mounting device relative to the frame of the work machine,
the mounting location of the at least one mounting device and the at least one imaging device on the work machine, and
the field of view of the at least one imaging device; and
generate a pictorial view depicting the areas of the one or more blind spots around the work machine and outside the field of view of the at least one imaging device.

10. The monitoring system of claim 9, further comprising a user interface configured to:
receive the pictorial view from the controller; and
display the pictorial view.

11. The monitoring system of claim 10, wherein the user interface is:
present within an operator cabin of the work machine, or
present at a remote operator station that is externally located relative to the work machine.

12. The monitoring system of claim 10, wherein the controller is further configured to:
generate a plurality of pictorial views corresponding to a plurality of work machines; and
transmit, to the user interface, at least one pictorial view from the plurality of pictorial views based on an operator input.

13. The monitoring system of claim 9, wherein:
the at least one mounting device comprises at least one position sensor configured to:
determine the current orientation of the at least one mounting device relative to the frame; and
generate the positional signal indicative of the current orientation of the at least one mounting device relative to the frame, and
the controller receives the positional signal from the at least one position sensor of the at least one mounting device.

14. The monitoring system of claim 9, wherein the controller is configured to generate the pictorial view, depicting the areas of the one or more blind spots, at times at which the positional signal indicates that the current orientation of the at least one mounting device, relative to the frame of the work machine, has been adjusted.

15. The monitoring system of claim 9, wherein the pictorial view further depicts second areas within the field of view of the at least one imaging device.

16. The monitoring system of claim 9, wherein, based on determining the areas of the one or more blind spots, around the work machine and outside the field of view of the at least one imaging device, the controller is further configured to generate an output signal for adjusting the current orientation of the at least one mounting device in order to minimize the areas of the one or more blind spots.

17. A method of generating awareness of a surrounding area around a work machine, the method comprising:
receiving, by a controller, a positional signal indicative of a current orientation of at least one mounting device, wherein the at least one mounting device:
is adapted to support at least one imaging device on the work machine, and comprises components that movably couple the at least one mounting device to a frame of the work machine and cause the at least one mounting device to be adjustable to a plurality of orientations relative to the frame of the work machine;

determining, by the controller, a mounting location of the at least one mounting device and the at least one imaging device on the work machine;

determining, by the controller, a field of view of the at least one imaging device;

determining, by the controller, areas of one or more blind spots, within the surrounding area around the work machine and outside the field of view of the at least one imaging device, based on:
- the current orientation of the at least one mounting device relative to the frame of the work machine,
- the mounting location of the at least one mounting device and the at least one imaging device on the work machine, and
- the field of view of the at least one imaging device;

generating, by the controller, a pictorial view depicting the areas of the one or more blind spots within the surrounding area around the work machine and outside the field of view of the at least one imaging device; and displaying, on a user interface, the pictorial view depicting the areas of the one or more blind spots.

18. The method of claim 17, further comprising generating, by the controller, the pictorial view depicting the areas of the one or more blind spots at times at which the positional signal indicates that the current orientation of the at least one mounting device, relative to the frame of the work machine, has been adjusted.

19. The method of claim 17, further comprising:
generating, by the controller, a plurality of pictorial views corresponding to a plurality of work machines; and
transmitting, by the controller, at least one pictorial view from the plurality of pictorial views based on an operator input.

20. The method of claim 17, further comprising generating, by the controller, an output signal for adjusting the current orientation of the at least one mounting device in order to minimize the areas of the one or more blind spots based on determining the areas of the one or more blind spots within the surrounding area around the work machine.

* * * * *